United States Patent [19]
Maliczyszyn et al.

[11] Patent Number: 5,340,405
[45] Date of Patent: Aug. 23, 1994

[54] HIGH SOLIDS LIQUID STARCH PREPARED BY BATCH COOKING

[75] Inventors: Walter Maliczyszyn, Somerville; Leroy Peek, Milford; Paul Gregory, Flanders, all of N.J.

[73] Assignee: National Starch and Chemical Investment Holding Corporation, Wilmington, Del.

[21] Appl. No.: 77,223

[22] Filed: Jun. 14, 1993

[51] Int. Cl.$^5$ .............................. C08B 30/00
[52] U.S. Cl. .................... 127/65; 127/32; 127/67; 127/68; 127/71
[58] Field of Search ............... 127/32, 65, 67, 68, 127/71

[56] References Cited

U.S. PATENT DOCUMENTS

| | | | |
|---|---|---|---|
| 2,919,214 | 12/1959 | Etheridge | 127/28 |
| 3,133,836 | 5/1964 | Winfrey et al. | 127/71 |
| 3,962,079 | 6/1976 | Hunt et al. | 210/47 |
| 4,613,407 | 9/1986 | Huchette et al. | 162/175 |
| 4,726,809 | 2/1988 | DeBoer et al. | 106/210 |
| 5,131,953 | 7/1992 | Kasica et al. | 127/65 |

OTHER PUBLICATIONS

"Starch: Chemistry and Technology", edited by Roy Whistler et al., 1984, pp. 555–557.

*Primary Examiner*—Paul Lieberman
*Assistant Examiner*—Patricia L. Hailey
*Attorney, Agent, or Firm*—Eugene Zagarella, Jr.

[57] ABSTRACT

A method of preparing high solids liquid starch is provided using a modified two step batch cooking procedure.

19 Claims, No Drawings

HIGH SOLIDS LIQUID STARCH PREPARED BY BATCH COOKING

BACKGROUND OF THE INVENTION

This invention relates to a method of preparing high solids liquid starch using a modified two step batch cooking procedure.

The ability to provide high solids liquid starch products which are stable and readily useful is highly desired for various end uses. Such starch products have been available and produced for many years in continuous cooking processes using a heat exchanger or jet cooker. Illustrative processes and equipment used therein are described in U.S. Pat. No. 2,919,214 issued Dec. 29, 1959 to O. Etheridge; U.S. Pat. No. 3,133,836 issued May 19, 1964 to V. Winfrey et al.; U.S. Pat. No. 5,131,953 issued Jul. 21, 1992 to J. Kasica et al. and in Chapter XVIII of *Starch:Chemistry and Technology*, edited by Roy Whistler et al., 1984, pp. 555–557.

While the continuous cooking processes as described above, do provide high solids starch products, they involve the use of high pressure steam and specially modified jet cooking equipment and conditions which may not always be available. Furthermore, in some situations it may not be economically feasible to build and install the needed equipment. In such circumstances, standard batch operations may be employed, however, they usually require special mixing equipment such as "gate" or "racker arm" type agitators in order to provide high solids starches. When using standard batch cooking processes with other common or conventional mixers, the desired levels of high solids content, i.e. 15% or more, cannot be attained because the cooked starches have such high final viscosities and peak viscosities during cooking that they are not easily mixable, pumpable, or handleable. This is especially true in batch tanks containing turbine type agitators which can be easily "overloaded" by the extremely high peak viscosity during the cooking process. In this instance the drive motor might "burn out" or the agitator could either "bend" or "bore a hole" in the starch gel produced.

Accordingly, there is need for a process of providing stable, high solids liquid starch products wherein the use of special and costly equipment such as involved in continuous cooking operations are not required.

SUMMARY OF THE INVENTION

Now it has been found that liquid starch products having a high solids content and suitable viscosity for easy mixing during the cooking process plus easy handleability and pumpability in final applications are provided via a modified two step batch cooking operation.

More particularly, this invention involves a method of preparing a high solids, predispersed liquid starch in a batch process comprising:
  a) heating an aqueous slurry of a waxy starch having a solids content of about 0 to 25% and a pH of at least about 4.0 until such starch is thoroughly cooked and dispersed, and
  b) slowly adding an aqueous slurry of waxy starch having a solids content of about 30 to 50% until the starch is thoroughly cooked and dispersed and the desired solids content is reached.

DETAILED DESCRIPTION OF THE INVENTION

In carrying out the method of this invention, an aqueous starch slurry is heated or cooked with agitation and mixing in a stepwise batch operation with the pH of the slurry being adjusted to at least 4.0 and more particularly from about 4.0 to 13.5. Initially, an aqueous solution containing a small amount of starch of from about 0 to 25, preferably 0 to 15% by weight and maintained at a pH of at least about 4.0 is added to a first tank or container which is equipped with an agitator or mixing device as well as heating means. The heating means may be in the form of steam injection, steam jacket or coil, or an electric heater or other alternate form of direct or indirect heating. This initial aqueous starch slurry is thoroughly cooked and dispersed by heating to a temperature at least and preferably higher than the gelatinization temperature of the particular starch being used. An alkaline dispersion can be formed by adding alkali to adjust the pH of the slurry to 7 or more and this will facilitate gelatinization or cooking and a lower temperature can be used. Typically this temperature will be in the range of about 180° to 210° F., or when using alkali, the temperature will be lower in the range of about 80° to 150° F. Cooking will be carried out for a long enough time to allow substantially complete gelatinization and dispersion of the starch, usually for about 10 to 60 and preferably about 20 to 40 minutes after the final cooking temperature is reached.

When using an alkaline dispersion, sufficient alkali is added to raise the pH to 7.0 or more, more particularly from about 7.0 to 13.5 and preferably from about 10 to 12. Various types of alkali can be used including alkali metal hydroxides such as sodium hydroxide and potassium hydroxide and alkaline earth hydroxides such as calcium hydroxide. Sodium hydroxide is the preferred alkali material.

In a second step or stage, an aqueous slurry of the starch having a high solids content of about 30 to 50%, preferably about 35 to 45% is slowly added to the first precooked or predispersed solution. This slow addition involves pumping the colder high solids slurry into the precooked, heated or alkaline dispersed starch cook at a controlled rate such that the temperature is always maintained above the gelatinization point of the starch. This temperature will depend on whether a heated solution (without alkali) or an alkaline dispersion is used and the particular starch that is used. In the case of the heated solution without alkali, the temperature will be at least 180° F. while when using an alkaline dispersion the temperature may be lower and in the range of 80° to 150° F., although higher temperatures can be used. Sufficient high solids slurry is added to raise the total or final cook solids to the final desired level of greater than about 15%, more particularly from about 20 to 40% and preferably from about 25 to 40%. The slow addition time will vary depending on how cold the high solids slurry is, the slurry solids and the level of solids desired in the final product as well as ambient conditions. Typically this can take from about 30 to 60 minutes. The important thing is not the actual time but rather that the starch is allowed to mix in slowly and be agitated and have an overall manageable viscosity so it won't gel up all at once. After sufficient starch has been added to attain the desired final cook solids the temperature is allowed to increase again to about 200° to 210° F. and held there for an additional period, e.g. about 10 to 60 and preferably about 20 to 40 minutes, to insure that cooking is completed and the starch is thoroughly cooked and dispersed. If desired, the liquid starch product can be cooled using a cooling coil or other available cooling means before it is shipped or stored for later use.

The high solids liquid product, prepared by the method as described herein, are readily pumpable and handleable at viscosities of up to about 25,000 cP Brookfield at room temperature or 72° F., (20 rpm) preferably up to about 15,000 cP.

The starting starch material used in this invention will be a cereal starch having an amylopectin content of 95% or more and more particularly the waxy starches including waxy maize and waxy rice. These starches may be degraded (i.e. converted) or non-degraded and have a fluidity or WF (water fluidity) number of about 20 to 85 and preferably about 30 to 40. The fluidity or converted starches are typically starches which are acid converted, although other chemical conversions such as enzyme conversion and oxidation may also be used. These starches are generally identified by the fluidity number (WF) as noted above, and the number is an inverse viscosity measurement or measure of the degree of degradation of the starch. The higher the fluidity number, the more degraded the starch and the thinner the viscosity. The measurement for "water fluidity" (WF) as described herein is made using a Thomas Rotational Shear-Type Viscometer (manufactured by Arthur H. Thomas Co., Philadelphia, Pa.) in accordance with standard procedures such as disclosed in U.S. Pat. No. 4,499,116 issued Feb. 12, 1985 to Zwiercan et al. Preparation of acid-converted starches follows conventional techniques where the starch base is treated with an acid, such as hydrochloric or sulfuric acid at a temperature, e.g. 65° to 135° C. for the length of time required to obtain the thinned starch that is sought.

The starch materials used in the method of this invention, as described above, can be unmodified or modified and the term starch as used herein includes both types. By modified it is meant that the starch can be derivatized or modified by typical processes known in the art, e.g. esterification, etherification, oxidation, acid hydrolysis, crosslinking, enzyme conversions, and other conventional modifications as described in publications such as "Starch:Chemistry and Technology" 2nd Edition, edited by R. L. Whistler et al., Chapter X, 1984. The starches used in the method of this invention may also be modified to include cationic, anionic or amphoteric groups in accordance with well known procedures. For example, cationization of the selected starch can be produced by chemical reactions with reagents containing amino, imino, ammonium, sulfonium or phosphonium groups as disclosed in "Cationic Starches" by D. B. Solarek, in *Modified Starches:Properties and Uses*, Chapter 8, 1986 and in U.S. Pat. No. 2,813,093 issued Nov. 12, 1957 to C. Caldwell et al. and U.S. Pat. No. 4,119,487 issued Oct. 10, 1978 to M. Tessler, all incorporated herein by reference. Such cationic derivatives include those containing nitrogen containing groups comprising primary, secondary, tertiary and quaternary amines and sulfonium and phosphonium groups attached through either ether or ester linkages. Preferred cationic derivatives are those containing the tertiary amino and quaternary ammonium ether groups such as dimethylaminoethyl ether and (trimethyl ammonium chloride)-2-hydroxypropyl ether groups. Particularly useful cationic derivatives are those containing amines or nitrogen groups having alkyl, aryl, aralkyl or cyclic substituents of up to 18 carbon atoms and especially alkyl of 1 to 6 carbon atoms.

Typical anionic substituents such as carboxyalkyl groups, sulfoalkyl groups and phosphate groups are disclosed in the U.S. Pat. No. 4,119,487 noted previously. Amphoteric starches have been prepared by dual treatments of starch with cationic and anionic modifying reagents. Cationic modification, such as noted above, have been combined with further substitution with phosphate, phosphonate, sulfate, sulfonate or carboxyl groups as disclosed in solarek, "cationic Starches", supra, pp. 120-121 and in U.S. Pat. Nos. 3,459,632; 3,562,103; 4,876,336 and 4,964,953, all of which are incorporated by reference.

Other starch derivatives, such as organosiloxane containing starches, as disclosed in U.S. Pat. No. 5,004,791 issued Apr. 2, 1991 to R. Billmers and incorporated herein by reference, may also be used as the starch based starting material in the method of this invention.

The following examples will further illustrate the embodiments of this invention. In these examples all parts are given by weight and all temperatures in degrees Celsius unless otherwise noted.

EXAMPLE I

An aqueous solution of quaternary waxy maize starch was slurried at 10% solids in a cook tank which had an agitator and was heated by live steam injection to a temperature of about 200°-205° F. over 20 to 45 minutes. After the temperature was reached, the solution was held there for about 10 minutes to insure thorough cooking and dispersion. An aqueous solution of the same starch was mixed and slurried in a second tank at a solids content of about 40 to 45% and slowly added to the cook tank at a controlled rate over 30-60 minutes to maintain the temperature in the cook tank always above 180° F. Sufficient high solids starch was added to raise the total final cook solids to the desired amount of 25 to 35%. After the starch was completely added, the temperature was raised back to 200°-205° F. and held there for an additional 15 minutes to insure thorough cooking and dispersion.

The prepared starch Sample A had a solids content of 25.8% and a Brookfield viscosity at room temperature (72° F.) and 20 rpm of 3200 cP. Additionally the prepared starch product was tested for dry tensile strength using TAPPI T494 (1982) using constant rate of elongation apparatus and found to be 1327 g/inch at 10 lbs/ton and 1421 g/inch at 20 lbs/ton.

EXAMPLE II

Another starch Sample B was prepared using the same starting base starch and the same stepwise batch procedures and methods of analysis as used in Example I. For comparison purposes, a third sample using the same starch starting material was cooked in a jet cooker (Model C-80 available from National Starch and Chemical Company) at a temperature of about 315° F. Results are given below:

| Sample | Solids (%) | Viscosity (cP) | Dry Tensile Strength | |
|---|---|---|---|---|
| | | | 10 lb/t | 20 lb/t |
| A | 25.8 | 3,200 | 1327 | 1421 |
| B | 25.4 | 2,660 | 1249 | 1325 |
| Control (Jet Cooked) | 25.0 | 11,900 | 1218 | 1319 |

Results show that not only could high solids starch be prepared using the batch procedure of this invention but performance was somewhat better than obtained when using jet cooking.

EXAMPLE III

Additional modified starches were used as the base material in the batch method of this invention with the following results.

| Starch Type | Solids (%) | Viscosity (cP) |
|---|---|---|
| Waxy maize (ethyl amino diphosphonic acid group) | 25 | 3,150 |
| Waxy maize (carboxysulfoethyl ether group) | 25 | 2,110 |
| Waxy maize (sodium tripolyphosphate/quaternary ammonium group) | 25 | 2,950 |

EXAMPLE IV

A 6% aqueous solution of sodium hydroxide was placed in a cook tank, mixed with a motor/paddle agitator and then heated to 140° F. An aqueous solution of a starch derivative, i.e. phosphonate group on 50 WF waxy starch, was slurried at about 40% solids and slowly added to the cook tank at a controlled rate over 30–60 minutes. The cook was kept at 140° F. for an additional 10–20 minutes then cooled to room temperature.

The prepared starch cook had a solids content of 30% and a Brookfield viscosity at room temperature (72° F.) at 20 rpm of 9740 cP.

What is claimed is:

1. A method of preparing a high solids of 15% or more, predispersed liquid starch in a batch process comprising:
   a) heating an aqueous slurry of a waxy starch having an amylopectin content of 95% or more and a solid content of about 0 to 25% by weight and maintained at a pH of at least about 4.0 until such starch is thoroughly cooked and dispersed, and
   b) slowing adding an aqueous slurry of waxy starch having an amylopectin content of 95% or more and a solids content of about 30 to 50% at a rate which maintains the temperature at least as high as the gelatinized temperature of the starch until the starch is thoroughly cooked and dispersed and the desired solids content is reached.

2. The method of claim 1 wherein the temperature is maintained at 180° F. or higher during the slow addition of the higher solids starch.

3. The method of claim 2 wherein the waxy starch has a water fluidity (WF) of about 20 to 85.

4. The method of claim 3 wherein the waxy starch contains a tertiary amine or quaternary ammonium ether cationic group.

5. The method of claim 1 wherein the first aqueous slurry has a solids content of about 0 to 15% by weight and the slow added high solids slurry has a solids content of about 35 to 45%.

6. The method of claim 1 wherein the waxy starch has a water fluidity (WF) of about 30 to 40.

7. The method of claim 6 wherein the temperature is maintained at 180° F. or higher during the slow addition of the higher solids starch.

8. The method of claim 7 wherein the waxy starch contains a tertiary amine or quaternary ammonium ether cationic group.

9. The method of claim 7 wherein the first aqueous slurry has a solids content of about 0 to 15% by weight and the slow added high solids slurry has a solids content of about 35 to 45%.

10. The method of claim 1 wherein the first aqueous slurry has a pH of 7 or more.

11. The method of claim 10 wherein the temperature is maintained at about 80° F. or higher during the slow addition of the higher solids starch.

12. The method of claim 11 wherein the waxy starch has a water fluidity (WF) of about 20 to 85.

13. The method of claim 12 wherein the waxy starch contains a tertiary amine or quaternary ammonium ether cationic group.

14. The method of claim 11 wherein the first aqueous slurry has a pH of about 10 to 12.

15. The method of claim 14 wherein the waxy starch has a water fluidity (WF) of about 20 to 85.

16. The method of claim 10 wherein the first aqueous slurry has a solids content of about 0 to 15% by weight and the slow added high solids slurry has a solids content of about 35 to 45%.

17. The method of claim 16 wherein the temperature is maintained at about 80° F. or higher during the slow addition of the high solids starch and the waxy starch material has a water fluidity (WF) of about 20 to 85.

18. The method of claim 1 wherein the prepared starch has a high solids content of from about 20 to 40%.

19. The method of claim 9 wherein the prepared starch has a high solids content of from about 20 to 40%.

* * * * *